US012769741B2

(12) United States Patent
Strader

(10) Patent No.: US 12,769,741 B2
(45) Date of Patent: Oct. 20, 2026

(54) DATA RETRIEVAL VIA SECURE DATABASE QUERY GENERATION

(71) Applicant: Seismic Software, Inc., San Diego, CA (US)

(72) Inventor: Thomas H. Strader, Northlake, TX (US)

(73) Assignee: Seismic Software, Inc., San Diego, CA (US)

( * ) Notice: Subject to any disclaimer, the term of this patent is extended or adjusted under 35 U.S.C. 154(b) by 0 days.

(21) Appl. No.: 19/048,553

(22) Filed: Feb. 7, 2025

(65) Prior Publication Data

US 2025/0321967 A1 Oct. 16, 2025

Related U.S. Application Data

(60) Provisional application No. 63/554,671, filed on Feb. 16, 2024.

(51) Int. Cl.
*G06F 7/00* (2006.01)
*G06F 16/22* (2019.01)
(Continued)

(52) U.S. Cl.
CPC .... *G06F 16/24553* (2019.01); *G06F 16/2282* (2019.01); *G06F 16/243* (2019.01); *G06F 16/248* (2019.01)

(58) Field of Classification Search
CPC ............. G06F 16/3347; G06F 16/3344; G06F 16/332; G06F 16/3322; G06F 16/35; G06F 16/24542; G06F 16/24553; G06F 16/2455; G06F 16/24522; G06F 16/2425; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/383; G06F 16/285; G06F 16/9535; G06F 16/3329; G06F 16/90332; G06F 16/90335; G06F 16/217; G06F 16/353; G06F 16/2282; G06N 5/04; G06N 5/01; G06N 5/02; G06N 5/048; G06N 5/022; G06N 20/00; G06N 20/20; G06N 5/018; G06N 3/105; G06N 3/044; G06N 3/082
See application file for complete search history.

(56) References Cited

U.S. PATENT DOCUMENTS

| | | | | |
|---|---|---|---|---|
| 2025/0131235 | A1* | 4/2025 | Zangrilli | G06N 3/042 |
| 2025/0150423 | A1* | 5/2025 | Burford | H04L 51/216 |

(Continued)

*Primary Examiner* — Mohammad A Sana
(74) *Attorney, Agent, or Firm* — Van Pelt, Yi & James LLP

(57) ABSTRACT

Data retrieval via secure database query generation is disclosed, including: receiving, via a user interface, a user submitted request for data associated with a business context; generating a prompt to an initialized database query generation model specific to the business context based at least in part on the user submitted request; providing the prompt to the initialized database query generation model; determining a database query based at least in part on an output from the initialized database query generation model; and querying a database for matching data using the database query, wherein the matching data comprises a set of data values fetched from one or more tables of data.

18 Claims, 11 Drawing Sheets

(51) Int. Cl.
*G06F 16/242* (2019.01)
*G06F 16/2455* (2019.01)
*G06F 16/248* (2019.01)

(56) References Cited

U.S. PATENT DOCUMENTS

| | | | | |
|---|---|---|---|---|
| 2025/0156413 | A1* | 5/2025 | Barkan | G06F 40/295 |
| 2025/0165465 | A1* | 5/2025 | Lee | G06F 16/285 |
| 2025/0190604 | A1* | 6/2025 | Fu | G06F 16/242 |
| 2025/0200088 | A1* | 6/2025 | Shanmugam | G06N 3/0455 |

* cited by examiner

DATA RETRIEVAL VIA SECURE DATABASE QUERY GENERATION

CROSS REFERENCE TO OTHER APPLICATIONS

This application claims priority to U.S. Provisional Patent Application No. 63/554,671 entitled INTERFACE FOR RETRIEVING INFORMATION FROM DATA VIA SECURE DATABASE QUERY GENERATION filed Feb. 16, 2024 which is incorporated herein by reference for all purposes.

BACKGROUND OF THE INVENTION

Traditionally, only users with technical skills in writing structured query language (SQL) for databases were able to retrieve the desired data that is stored at the databases. However, even users that were knowledgeable on SQL semantics may not be familiar with the parameters with which the desired domain-specific data is stored at the databases. It would be desirable to programmatically interface a user of any database query language skill level with a database to ensure that data which is desired by the user is successfully accessed from the database and in a secure way.

BRIEF DESCRIPTION OF THE DRA WINGS

Various embodiments of the invention are disclosed in the following detailed description and the accompanying drawings.

DETAILED DESCRIPTION

Figure 1:
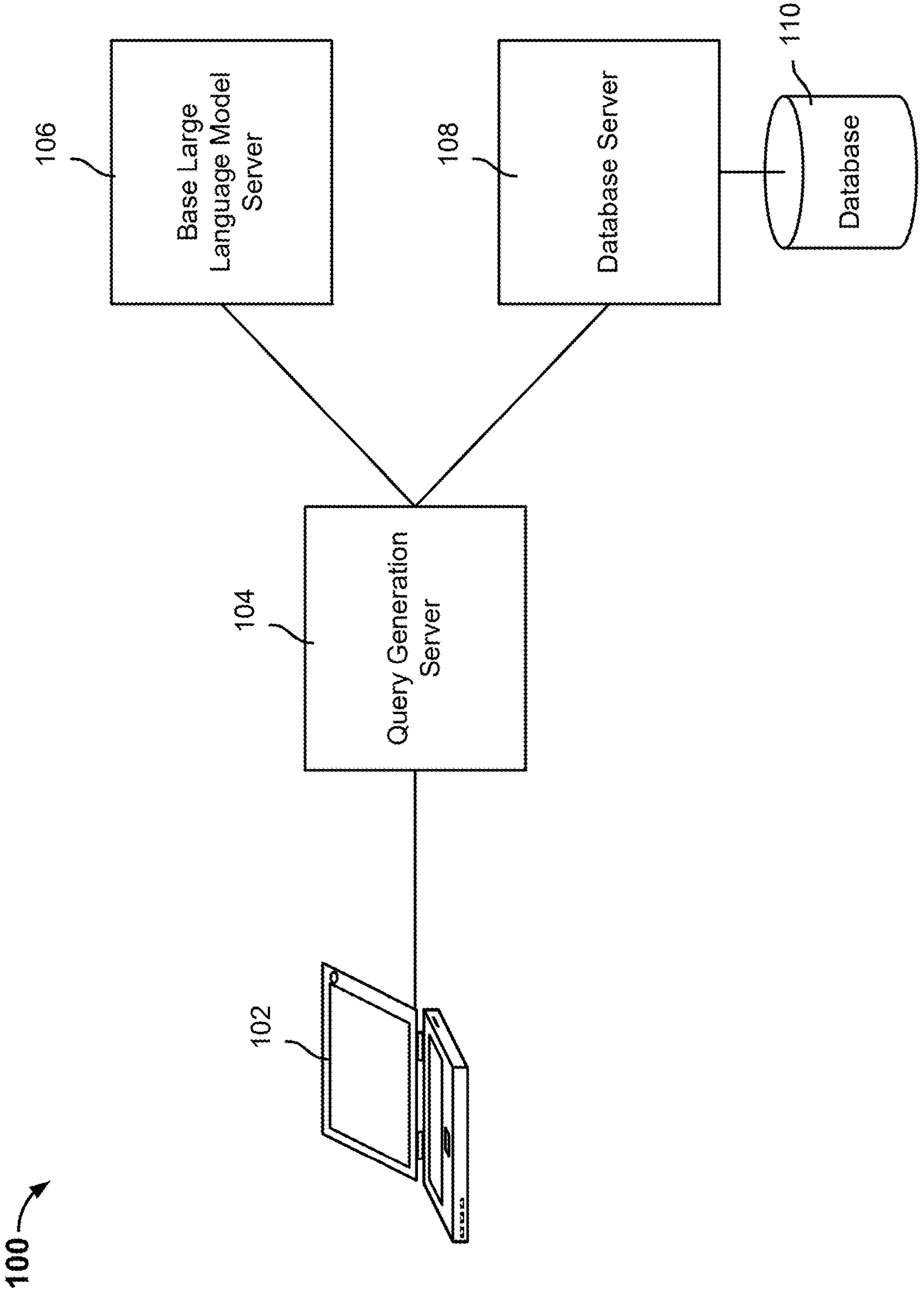
FIG. 1 is a diagram showing an embodiment of a system for data retrieval via secure database query generation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of data retrieval via secure database query generation are described herein. A user submitted request for data associated with a business context is received via a user interface. Examples of a business context include a program, a content item, a logical space (e.g., a digital room), a location (e.g., a folder) in a directory, and an account. In various embodiments, data associated with different business contexts are stored within a database. In some embodiments, the specific business context with which the user submitted request is associated is determined based on a user selection at a website or a user launching an application. In some embodiments, the user submitted request is a question written in natural language. In some embodiments, a database query generation model is initialized/prepared by programmatically prompting a base large language model (LLM) with a system message that includes static configuration that is specific to generating structured query language (SQL) queries to a database for the specific business context as well as information associated with the requesting user or the specific business context that was dynamically determined. For example, the static configuration that is specific to generating SQL queries to the database for the specific business context includes an identified portion of the database that is relevant to the business context, SQL syntax rules to follow, and/or business semantics related to that business context. For example, the dynamically determined information related to the requesting user may include a user identity (e.g., a user name), an organization associated with the user, a role associated with the user, and/or a geographic location associated with the user. For example, the dynamically determined information related to the specific business context may include the name of an individual who is the administrator of that business context or the name of the object/program that the specific business context represents. After the base LLM is initialized by the system message into the initialized database query generation model specific to the business context, a prompt to request the initialized database query generation model to generate a database language (e.g., SQL) query is generated based on the user submitted request. The output from the initialized database query generation model is analyzed to determine whether the output SQL query as-is meets a set of query criteria (e.g., associated with the requested data scope, data security rules, user's given permissions, valid SQL syntax, etc.) or if the output needs to be post-processed (e.g., modified) to meet the criteria. If appropriate, the output SQL query is modified to meet the set of query criteria. The (modified) SQL query is then sent to a database to query for matching data. The matching data from the database comprises data values from the plurality of tables that are stored at the database.

As will be described in further detail below, while LLMs understand basic SQL semantics and can produce valid SQL, the base models require significant supplemental information to ensure natural language questions are correctly interpreted so that the SQL is not only syntactically correct, but also retrieves the requested data from a database in a secure and reliable way. It would be desirable to instruct an LLM of the proper way to respond to questions related to a specific business context with a valid SQL query but also potentially post-process the generated SQL query to maintain data access rights.

FIG. 1 is a diagram showing an embodiment of a system for data retrieval via secure database query generation. As shown in the example of FIG. 1, system 100 includes end user device 102, query generation server 104, base large language model (LLM) server 106, database server 108, and database 110. While not shown in FIG. 1, each of end user device 102, query generation server 104, base LLM server 106, database server 108, and database 110 can communicate with each other over one or more networks. For example, while end user device 102 shown to be a laptop computer, end user device 102 may be a desktop computer, a smart phone, a tablet device, or any other computing device.

Prior to runtime at which query generation server 104 services requests for data from an end user using an end user device such as end user device 102, query generation server 104 has stored data associated with one or more business contexts to database 110, which is managed by database server 108 associated with a database platform. In some embodiments, query generation server 104 obtains domain-specific data, stores the data at database 110, and also stores an awareness of the tables and/or fields of database 110 at which the data specific to each business context of the domain has been stored. In one specific example, the domain-specific data that is obtained by query generation server 104 tracks user activity (e.g., viewing, downloading, sharing, updating, etc.) with respect to content items (e.g., documents, presentations, media files) in one or more content libraries.

Also, prior to runtime, in various embodiments, configuring users associated with query generation server 104 have prepared and saved different instances of the static configuration portions of system messages that will be used to initialize a base LLM that is run by base LLM server 106 to prepare the model to subsequently behave as a database query generation model (or sometimes referred to as an "AI assistant"). In various embodiments, for each different business context, one or more instances of a business context-specific static configuration of a system message (or sometimes referred to as a "system prompt") are preconfigured by a configuring user to enable a base LLM that will be eventually prompted using the system message to generate SQL queries to access data that is relevant to the business context from database 110. Put another way, each business context-specific static configuration of a system message provides business context-specific predefined context to the base LLM so that the LLM can be prepared to subsequently serve as a database query generation model that can generate SQL queries that will be constrained (e.g., in SQL syntax, in the location(s) of database 110) by the predefined context. In various embodiments, each business context-specific static configuration of a system message describes which table(s) and field(s) at database 110 store the data related to that particular business context. In addition to such business context-specific table and field access and purpose description, as will be described in further detail below, each instance of a business context-specific static portion of a system message may additionally include one or more of the following: assistant job description, response rules and fundamentals, common aggregations, use case additional context, and introductory command.

At runtime, end users can enter specific business contexts and submit requests (e.g., using an end user device such as end user device 102) for business context-specific data that is stored at database 110. In some embodiments, an end user enters a specific business context by navigating to a webpage associated with that specific business context or by launching a software application related to that specific business context. In some embodiments, after an end user enters a particular specific business context, query generation server 104 is configured to dynamically determine information related to the end user and/or the business context. Then, query generation server 104 is configured to retrieve from storage, a stored static configuration (as described above) for that specific business context. Query generation server 104 is configured to generate a system message that includes the stored static configuration corresponding to the specific business context and the dynamically determined information. Next, query generation server 104 is configured to send the system message to an instance of a base LLM run by base LLM server 106 to prompt/initialize the base LLM to subsequently act as a business context-specific database query generation model (or "AI assistant"). After the business context-specific database query generation model has been initialized, query generation server 104 is configured to present a user interface at end user device 102 through which the end user can input/submit user requests for data associated with that business context. In some embodiments, each user request can be a question phrased in natural language (e.g., including the use of business semantics related to the business context). In response to each request that is submitted by the end user from end user device 102, query generation server 104 is configured to generate a new prompt to the initialized database query generation model for a new SQL query to fetch the requested data from database 110. As will be described in further detail below, in some embodiments, each new prompt includes the original system message that was sent to the base LLM run by base LLM server 106 as well as any messages/requests submitted by the end user or messages output by the initialized database query generation model in the same "conversation" (e.g., the same session of this end user's use of the model) so that the conversation is carried forward and provided to the LLM upon each new user request so that each new user request is provided with the full context of the conversation.

In response to each new prompt, the database query generation model (an instance of a base LLM that has been prompted by the business context-specific system message) run by base LLM server 106 is configured to output and return to query generation server 104 an SQL query that is intended to fetch (and/or aggregate) the data that is requested by the user request from database 110. Before sending the model output SQL query (as-is) to database server 108 to fetch data from database 110, query generation server 104 is configured to first evaluate whether the model output SQL query meets a set of query criteria. The set of query criteria comprises one or more conditions that confirm that the model output SQL query meets data security rules and/or is relevant to the original user request. For example, a set of query criteria describes row(s) of data to which the end user can access, column(s) of data to which the end user can access, one or more documents to which the SQL query should be relevant, and/or valid SQL syntax. If the model output SQL query does not meet one or more query criterion, then query generation server 104 is configured to modify the model output SQL to conform to the query criteria and/or generate a new prompt to the database query generation model to obtain a new model output SQL (that is more likely to meet the query criteria). Query generation server 104 is then configured to pass along the modified (or new) SQL query to database server 108 to fetch and return to query generation server 104 data that is responsive to the query from database 110.

After query generation server 104 receives the data that is responsive to the query from database 110, query generation server 104 is configured to generate a presentation based on the matching data. In a first example, query generation server 104 is configured to present the matching data, which may comprise a structured data at the user interface at end user device 102. In a second example, query generation server 104 is configured to derive a summary (e.g., a natural language summary) from the matching data and then present the summary along with or in place of the matching data itself at the user interface at end user device 102. In some embodiments, query generation server 104 is configured to infer an action to be taken from the user request and perform that action with respect to each identified target entity among the matching data returned from database 110, as will be described in further detail below.

While FIG. 1 shows that instances of base LLMs are run on a separate server, base LLM server 106, in some other embodiments, instances of base LLMs may be run local to query generation server 104 to further reduce the time query generation server 104 needs to wait for a response to a prompt.

As shown with FIG. 1, query generation server 104 acts as an intermediary between an LLM that is leveraged to generate database queries and a target database platform, making it so that the LLM cannot directly access the potentially sensitive data at the database or directly return the data retrieved from the database to the user that had prompted for the generation of an SQL query in the first place. Various embodiments described herein also enable query generation server 104 to provide context to the LLM to guide its subsequent database query generation behavior during runtime/inference. The context is provided to constrain the types of responses that the LLM will generate in response to subsequent requests for SQL queries for specified data and in a manner that is also consistent with data security criteria.

Figure 2:
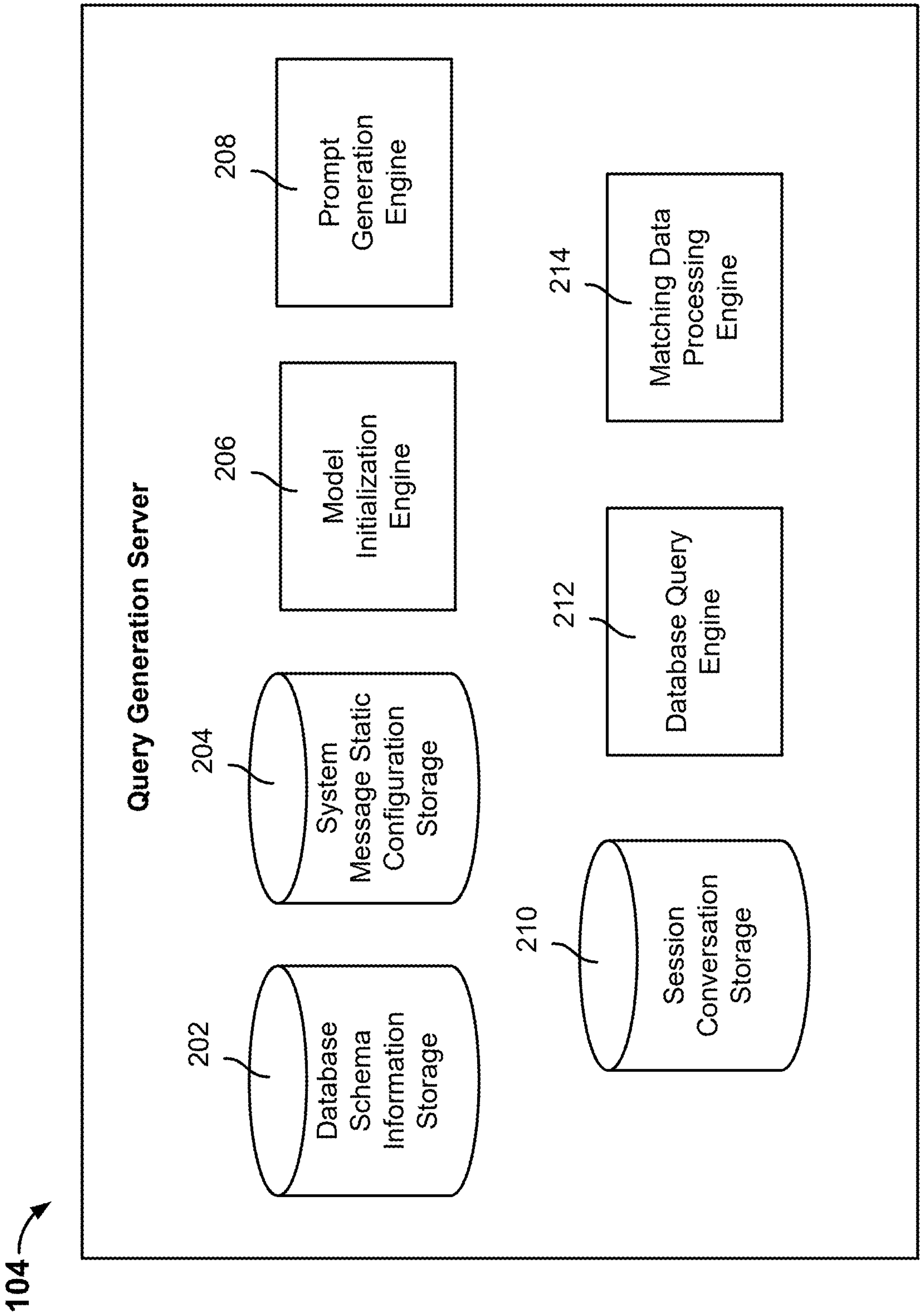
FIG. 2 is a diagram showing an example of a query generation server in accordance with some embodiments.

FIG. 2 is a diagram showing an example of a query generation server in accordance with some embodiments. In some embodiments, query generation server 104 of system 100 of FIG. 1 may be implemented, at least in part, using the example of FIG. 2. As shown in FIG. 2, the example query generation server includes database schema information storage 202, system message static configuration storage 204, model initialization engine 206, prompt generation engine 208, session conversation storage 210, database query engine 212, and matching data processing engine 214. Each of database schema information storage 202, system message static configuration storage 204, model initialization engine 206, prompt generation engine 208, session conversation storage 210, database query engine 212, and matching data processing engine 214 may be implemented using hardware (e.g., one or more processors and one or more memories) and/or software.

Database schema information storage 202 is configured to store information regarding the schema of the one or more databases. In particular, database schema information storage 202 is configured to store schema of database(s) at which domain-specific data that is to be fetched via SQL queries generated by business context-specific database query generation models, are stored. In some embodiments, as business context-specific data is stored over time at the database(s), the portions of each database schema at which the data related to each business context has been stored are tracked at database schema information storage 202. Put another way, database schema information storage 202 stores for each business context, the target portion of (e.g., the set of tables and fields that exist at) a given database platform at which data related to the business context is stored. Furthermore, database schema information storage 202 stores for each business context the purpose/description of the relevant set of tables and fields in the given platform at which data related to the business context is stored. For example, the description of a table or field therein may be in business terms and/or include examples of terms an end user may use that refer to the table.

System message static configuration storage 204 is configured to store sets of static configurations related to various business contexts that are to be included in system messages to an LLM. In some embodiments, one or more sets of static configurations related to different business contexts are configured (e.g., by prompt engineers) prior to runtime and then stored at system message static configuration storage 204. Each set of static configurations related to a particular business context is configured such that, during runtime, that set of static configurations can be dynamically included in a system message/prompt that is fed to an LLM to initialize/condition the LLM to behave as a database query generation model specific to that particular business context. Put another way, at runtime, the system message will be provided as a prompt with substantial context to the LLM so that the LLM will know how to correctly respond to natural language questions/requests within the current conversation (e.g., process subsequent prompts/requests for the generation of SQL queries to obtain a specified set of data) and within the constraints included in the system message. At runtime, after receiving the system message, the LLM's output/responses to subsequent prompts/questions are grounded in the provided context/system message and the LLM should know how to properly interpret questions and translate them into valid and correct SQL queries to fetch database data related to that particular business context. In some embodiments, a set of static configurations related to a business context includes one or more sections of query generation context.

In some embodiments, one or more of the following sections can be included in a set of static configurations that is related to a business context:

1. Assistant job description
2. Response rules & fundamentals
3. Table and field access and purpose
4. Common aggregations
5. Use case additional context
6. Introductory command An example description of each of the above sections in a stored set of static configurations related to a business context is described below:

1. Assistant Job Description

The job description informs the LLM what its purpose will be. In various embodiments, the LLM is informed that it will act as an assistant tasked with responding to user questions about data with valid SQL and additional context. In some embodiments, in this section, it is important to describe (in natural language) the desired general behaviors of the LLM in more detailed instructions than will be provided in subsequent portions of the context for the LLM.

A specific example assistant job description portion of the static configuration is provided below:

"You will be acting as an AI Target Database SQL Expert named Aura that writes SQL to query data about a Specified Domain, its users, content, and activity.

Your goal is to give correct, executable SQL queries to users.

You will be replying to users who will be confused if you don't respond in the character of Aura.

The user will ask questions or make statements about the information they are looking for. For each question you should respond and include an SQL query based on the question and the table."

2. Response Rules and Fundamentals

The rules and fundamentals section informs the LLM the syntaxial guidelines to use in generating SQL queries. While LLMs have been trained on massive amounts of SQL and have basic awareness that different database systems (e.g., Snowflake, Postgres, MySQL, etc.) may differ in syntax, they often still need help to ensure they are using the appropriate functions for the target database for which they are to generate SQL queries.

Additionally, this section helps the LLM understand the structure the response should take, which will help with downstream parsing and validation later.

For example, the response rules are broken down into several categories to help the LLM understand how to respond. The first section is about the structure of the response. A specific example is provided below:

"Here is a bulleted list of response rules you must abide by:

You MUST MUST wrap the generated SQL code within "'SQL code markdown in this format e.g., "'sql
(select 1) union (select 2)
"'

Make sure to generate a single SQL block, not multiple. If necessary, union multiple queries together.

You should only use the tables and columns listed below

If users ask questions that would not require a query, you should provide helpful responses that do not include SQL

. . . "

This section of the static configuration next includes some of the fundamentals of writing SQL that is intended to run on the given/target database platform. In the specific example below, the Snowflake database platform is the target database platform:

"Here is a bulleted list of Snowflake fundamentals:

When sorting DESC, always use the expression 'DESC NULLS LAST' to avoid nulls being sorted first QUALIFY statements must go before ORDER BY statements When using the INTERVAL function, make sure the number and unit are together in single quotes, e.g., INTERVAL '1 DAY'

When doing division, use div0 (a,b) rather than a/b"

Finally, this section of the static configuration includes a set of fundamentals to help the LLM properly know how to interpret user questions/prompts and statements and where it might seek answers in the data. Below is a specific example of describing the set of fundamentals:

"Here is a bulleted list of critical data model rules that you must abide by:

Use fuzzy match (ilike '% keyword %') on string-based equality checks unless the user puts the string in quotes, then do a strict match (='keyword')

Questions about revenue attribution refer to the UDM_AMOUNT column in the CRM_OPPORTUNITY table based on the linkages in the INTERACTIONCONTEXTS table between INTERACTIONID and CONTEXTID

. . . "

3. Table and Field Access and Purpose

Now that the LLM understands how it should respond, the table and field access and purpose section provides an important part of the context, which is that it describes for the particular business context, the target portion of (e.g., the list of tables and fields that exist at) the given database platform and what the purpose of those tables and fields are. In some embodiments, this table and field access and purpose related to the business context may be obtained from database schema information storage 202, as described above.

The table descriptions are important for the LLM's semantic understanding of the data. Providing a description of each table in business terms, as well as examples of terms a user may use that refer to the table are important to ensure the creation of a natural interface to the LLM for non-technical users.

This is one element that sets this approach apart from many LLM-driven approaches that attempt to allow the LLM to scan the data in order to understand the semantic meaning of all of the data. The business semantics are often nuanced and difficult for an LLM to understand through scanning unless the business semantics are explicitly explained to the LLM. For example, if there are multiple tables that appear to be lists of people, the LLM may not be able to disambiguate the purpose of one against another, which would lead to incorrect answers to questions resulting from incorrect joins, filters, aggregations, etc.

Below is a specific example of how to describe the business context-specific target portion (e.g., including a list of tables and field(s)) as context to the LLM:

"You have access to the following tables in Target Database Platform:

USERACTIVITY—this is a log of activities that users take

GROUPMEMBERS—this is a list of groups that each user is a member of. Each user can be in many groups, so you will want to get distinct user lists when filtering on groups. When users ask about users 'in' something like 'sales' they are typically referring to their groups.

USERS—this is the full list of users in the platform . . . "

After describing the tables in this section of the static configuration, in some embodiments, each of the fields within such tables are also described, including how fields join to other fields. This step is also useful to help the LLM understand which fields should be used for which purposes. Providing such specifics will help the LLM disambiguate among potentially similar fields. In this step, in some embodiments, it is also useful to provide lists of values in the data that users may use short-hand to refer to, since the LLM will be responsible for re-formatting these before writing SQL to ensure valid responses. When providing the list of values, the list can be configured to be exhaustive or not. The downside to being exhaustive is that it can cause the LLM to struggle to disambiguate, and so it is often preferable to provide only the most common values. And for the long tail of other values, the end user can be expected to be verbose in their questions to specify those values exactly. There is a tradeoff between the preconfigured amount of context to be provided in the LLM via the static configuration and the reliability/flexibility for the end user at runtime. For example, while a greater amount of preconfigured context in the static configuration may ensure greater response quality by the LLM, a downside is that the end user may have less flexibility in providing context at runtime.

Below is a specific example of how to describe the fields of the previously identified tables as context to the LLM:

"The columns in each of these tables are described below:

The USERACTIVITY table has the following columns:

ID: The id of the activity and primary id for events in this table

OCCURREDAT: The datetime when the activity occurred

USERID: The id of the user who took the action. This will need to be joined to the USERS table using the id column of the USERS table in order to get additional information about the user such as their name or email address, or joined to the USERID column of the GROUPMEMBERS table to get information about the groups the user is in APPLICATION: The application where that activity took place in The USERS table has the following columns:

ID: The id of the user, which can be joined to USERACTIVITY.USERID or GROUPMEMBERS.USERID FULLNAME: The full name of the user including their first and last name EMAIL: The email address of the user LICENSETYPE: The license type the user has, one of: business, premium, or partner"

4. Common Aggregations

In some cases, it is also helpful to provide a section of the static configuration to the LLM that includes some common aggregations and SQL patterns for common questions, or for difficult questions (e.g., related to the business context). While in general LLMs are quite capable of operating without these, the description of common aggregations (especially in relation to a specific business context) provides an extra level of predictability to the LLM's interpretation of the end user's questions.

The challenge with providing examples is the LLMs often anchor very hard on examples and these examples can overly bias the LLM's output, so care needs to be taken often to structure the output exactly as desired including all of the output text, not just the SQL response.

For example, instead of providing an example of a common aggregation such as:

"Question: How many users are there?

SQL: SELECT count (*) from USERS"

A better example of a common aggregation would be:

"Question: How many users are there?

Answer: In order to find the total number of users, we will count all of the rows in the USERS table "'sql SELECT count (*) from USERS

""'

There may be cases where the SQL is between two sections of text, so providing those examples is helpful as well.

The tradeoff in building prompts is in determining how many tokens should be spent on the input/prompt to the LLM in order to provide sufficient context to the LLM while not providing so much that the LLM degrades in its ability to meet the needs of the use case.

5. Use Case Additional Context

Now that after the LLM has all of the basics of the data and knows how to answer the end user's questions at runtime, the next section of the static configuration can provide any additional information that end users would understand based on the business context that the LLM is being invoked from.

For example, if the use case is for the LLM to answer user prompts/questions based on a business context that comprises a particular piece of content, the LLM needs to know that, so that when users say things like "how many views did this content get?", the LLM understands what "this content" is and does not need to ask the user to clarify so that it can understand "this content."

An example of additional use case content related to the business context that comprises the document "Getting Started with LLMs" is below:

"Additional Context:

When the user asks questions, all of their questions will pertain to the document 'Getting Started with LLMs' as all of the data has been pre-filtered to only be able to answer questions pertaining to that document."

6. Introductory Command

The static configuration can optionally have a section the includes an introductory command to the LLM to request the model to generate an initial output message (e.g., once per conversation with an end user) that acknowledges that it will be acting as an AI assistant for database query generation and ready to have a conversation in light of the other provided context. For example, the introductory command can tell the LLM how to begin the conversation to invite the end user to submit user requests for desired data stored at a given database platform.

Below is a specific example of an introductory command:

"Now to get started, please briefly introduce yourself.

Then provide a few example questions using bullet points."

Allowing a system message with the addition of the introductory command to be sent to the LLM at runtime will allow the LLM to provide helpful examples for the end user to understand what the assistant is capable of. And as the prompt evolves, so too will the way the assistant will introduce itself.

The above describes sections of a set of static configurations related to a business context describing only example sections and in practice, fewer, additional, or different sections can be preconfigured for a business context and stored at the set of static configurations corresponding to that business context at system message static configuration storage 204.

In some embodiments, one or more versions of a set of static configurations corresponding to a business context can be stored at system message static configuration storage 204. For example, different versions of a set of static configurations may be stored with different end user attributes. At runtime, when an end user enters a particular business context, a version of a set of static configurations corresponding to that business context can be selected for the end user to include in a system message that is to be fed to an LLM.

Model initialization engine 206 is configured to, at runtime, invoke a base LLM to act as a business context-specific database query generation model for a given end user. For example, in response to a detection that an end user has entered a business context on a given platform/website/application, model initialization engine 206 is configured to generate a system message corresponding to that business context and then send the system message to an instance of a base LLM. In some embodiments, the base LLM is running local to the query generation server (not shown in FIG. 2). In some embodiments, the base LLM is running at one or more cloud servers remote to the query generation server (not shown in FIG. 2). To generate the system message corresponding to the business context in which the end user has invoked/entered, model initialization engine 206 is configured to determine dynamic information related to this current session of data retrieval associated with this end user and also obtain (e.g., a corresponding version of) a set of static configurations (e.g., stored at system message static configuration storage 204) corresponding to the invoked/entered business context. For example, a new session of data retrieval associated with an end user is initiated each time that the end user newly invokes a business context and remains open for a configured period of time. In some embodiments, the dynamic information related to the current session of this end user may include the name of the invoked business context, the name of the object that the invoked business context represents (e.g., such as a program or a specific content item), and/or attributes associated with the end user (e.g., the end user's name, role, organization, and/or set of permissions). As such, not only does the system message provided to the LLM give it context to understand the user's questions, but the information can also include a dynamic portion, meaning the context varies not only for the use case, but the specific session/end user/the use case. For example, the stored static configuration portion of the system message may also include an introductory command and as such, in response to the system message, the recipient LLM may output (e.g., once per session/conversation) an introduction message to introduce itself as an AI assistant that is capable of generating SQL queries to obtain a target domain's data from a given database platform. Model initialization engine 206 can present the LLM's introduction message at a user interface for the end user to invite the end user to input/submit questions to the initialized LLM (which is also sometimes referred to as the initialized "database query generation model") to request for desired data in that business context. In some embodiments, model initialization engine 206 is also configured to store the generated system message as part of a new conversation that is associated with the end user's current session at session conversation storage 210. As will be described further below, each message/request/question that is submitted by the end user via the user interface to chat with the initialized database query generation model and also each output (e.g., that could be an SQL query or some other message) from the initialized database query generation model in that session are stored as part of the corresponding conversation at session conversation storage 210.

Prompt generation engine 208 is configured to generate prompts to the initialized database query generation model corresponding to a business context based on an end user's questions. As mentioned above, in some embodiments, in response to an end user's invocation of a business context, model initialization engine 206 is configured to initialize a base LLM to serve as the initialized database query generation model corresponding to that business context and also present a user interface over which the end user can submit questions/requests to the model during the current session. In response to each question/request that is received from the end user via the user interface, prompt generation engine 208 is configured to generate a new prompt to the initialized database query generation model based on that submitted question/request. In some embodiments, prompt generation engine 208 generates a new prompt including the original system message that was previously generated/sent to the model for the current session and any previous messages, if any, that have been sent in that session (and have been stored at session conversation storage 210). In various embodiments, the stored conversation corresponding to the session comprises the original system message as well as any messages (e.g., questions/requests) that have been sent by the end user to the initialized database query generation model and outputs (e.g., responses/SQL queries) that have been output by the model in response to the system message and prompts. That way, the initialized database query generation model is always grounded in the original system message even when it receives a new message/question from the end user. In response to the new prompt, the initialized database query generation model outputs a response, which is processed by database query engine 212, as will be described below. The initialized database query generation model's response to prompts that are generated by prompt generation engine 208 in the end user's current session are also stored in that session's conversation at session conversation storage 210 so that the conversation may be carried forward and provided to the initialized database query generation model with each new user request/question so that each subsequent question has the full context of the conversation.

Database query engine 212 is configured to receive an output (e.g., a model generated SQL query) that is generated by an initialized database query generation model in response to a new prompt (that is derived from a new user submitted question/request) from prompt generation engine 208. Database query engine 212 is configured to compare the output to a set of query criteria to evaluate whether the output should be modified (or sometimes referred to as "post-processed"). For example, the query criteria may describe data security rules to be met, database syntax rules to be met, data scope rules to be met, business context-specific rules to be met, and use case-specific rules to be met. In some embodiments, in the event that database query engine 212 determines that the SQL query output by the initialized database query generation model does not meet one or more criteria, then database query engine 212 is configured to modify the model output SQL query. In some embodiments, modifying the model output SQL query may include adding additional database row and/or column filter (s) to the original model output SQL query to further constrain the search for matching data at the target database platform.

Working with LLMs presents a unique challenge in data security as the LLM cannot be fundamentally trusted to enforce security. No matter how diligent a prompt can be constructed, there are almost always ways to get an LLM to violate its own instructions. Instead, it is important to provide post-processing on the SQL output by the initialized database query generation model (an LLM) to ensure that the model's SQL query output can be validated, does not violate data access rights, and/or is similar in scope to the requested scope of data. For generic LLM-generated outputs, it is nearly impossible to validate them because they are in a natural language format and therefore, lack a uniform structure. Furthermore, if a typical LLM-generated output could be validated, they likely could have been generated better in the first place. Luckily, SQL does not fall into that category. Due to the very structured and semantic nature of SQL and the rich set of SQL parsers, programmatically validating, modifying, and handling SQL post-processing is not only possible but also reliable.

Generally, data security for databases can be enforced in one of the following ways:

1. Role-based security policies enforced by the database
2. Session-based security policies enforced by the database
3. Code-based security policies enforced by developer code In some embodiments, for the purposes of LLM generated SQL, it is often preferable to leverage a code-based approach to security since there are often nuanced row-level filters required for the variety of use cases. In some embodiments, using high-level filters, such as role-based ones, may allow an LLM to reach into data that is undesirable for a given use case, even though a user may be able to access that data in other scenarios.

The following are example types of post-processing modifications to the model output SQL query in the form of row and/or column filtering that can be performed by database query engine 212:

1. Row-Level Filtering and Security

In some embodiments, database query engine 212 can modify an LLM output SQL query by adding constraints to the query to filter the data to be returned to be limited to a specified set of rows in one or more specified tables. In some embodiments, the row-level filtering can be determined based on the end user's organization, role, set of permissions, group/department within the organization, and the invoked business context. In some embodiments, row-level filtering of one or more tables can be performed by database query engine 212 to both handle security and data access controls, but also to facilitate use-case specific data targeting without needing to rely on the user-initiated prompt to the LLM to handle the appropriate data filtering.

Take for example the simple user submitted question:

"How many download activities are there?"

Giving this question to an LLM, the LLM could likely yield the following SQL:

"SELECT count (*) from ACTIVITIES where action='download'"

Which if the use case was a global use case, the model output SQL query would be correct. But what if the use case pertains only to a specific document (the document with ID of 123) (e.g., because the invoked business context pertained to a specific document)? Then the correct SQL should be the following:

"SELECT count (*) from ACTIVITIES where action='download' and docid=123"

But how can this be enforced? One way to limit the data to be returned to the requesting end user is to simply instruct the LLM to always make sure to filter all queries to ensure they filter to only include data for docid=123. Unfortunately, the LLM cannot be trusted to filter the data fetched from the database reliably.

Instead, in various embodiments, database query engine 212 is configured to post-process the model output SQL query to convert it from the original LLM-generated SQL query of:

"SELECT count (*) from ACTIVITIES where action='download'"

To the following modified query based on the specific document pertaining to the given business context:

"SELECT count (*) from (select * from ACTIVITIES where docid=123) ACTIVITIES where action='download'"

In this particular example, database query engine 212 modified the model output SQL query by replacing the ACTIVITIES table with a subquery to represent a filtered version of that table. This approach allows for relatively simple substitution of tables with filtered/constrained versions of themselves (where the filtered version is determined based on the business context invoked by the end user) while keeping the rest of the LLM-generated SQL query semantically correct.

In some embodiments, database query engine 212 can be configured to perform other advanced approaches with structured SQL parsers, but the end result is the same, which is the modification of the fundamental/base LLM-generated query SQL query to add row-level filtering on tables used as part of the query.

2. Column-Level Filtering/Masking and Security

In some embodiments, database query engine 212 can modify an LLM output SQL query by adding constraints to the query to filter the data to be returned to be limited to a specified set of columns in one or more specified tables. Some example reasons for performing column-level masking/filtering include restricting a user from accessing certain data such as personal identifiable information (PII) or sensitive financial information such as revenue, cost, etc. In some embodiments, the column-level filtering can be determined based on the end user's organization, role, set of permissions, group/department within the organization, and the invoked business context.

In some embodiments, database query engine 212 can add column-level filters to an LLM output SQL query using one or both of two approaches:

1. Omit the columns entirely; and/or
2. Replace at least a portion of the column values with redacted information Take for example the end user submitted question:

"Give me the list of users"

A prompt to the LLM (the initialized database query generation model) might output the query:

"SELECT * from USERS"

But what if there are several columns such as address, phone number, income or other attributes in that data that are restricted for the end user who had submitted the question?

In this particular example, database query engine 212 can modify the model output SQL query with a sub-query replacement, in which the replacement sub-query provides only the specific fields the end user should be able to access from the database as well as applying and specific redaction schemes for various fields, as shown below, so long as the field names remain the same, the modified SQL query will still be syntactically correct:

"SELECT * from (select id, name, left(email, 3) as email from USERS) USERS"

The above describes two example types (row-level filtering and column-level filtering) of model output SQL query modifications/post-processing that can be performed by database query engine 212 and in practice, other types of post-processing can also be performed by database query engine 212 on an LLM output SQL query for data security or other purposes. In terms of other types of post-processing that can be performed on an LLM output SQL query for data security purposes, in some embodiments, database query engine 212 can validate the model output SQL query against a predetermined query schema to confirm that the query is syntactically correct. In the event that the query cannot be validated, in some embodiments, the query may be programmatically modified by database query engine 212 to conform to the predetermined query schema. In some embodiments, the scope of the data that is to be retrieved by the LLM-generated SQL query is checked against the permission scope of data that is permitted to be accessed by the end user that had originated the question that led to the prompt/query to be sent to the LLM. For example, identifying information associated with the end user is used to determine a set of permissions (e.g., which types of data the user can read, write, update, delete) associated with the user and/or an organization with which the user is associated. Then, the set of permissions associated with the user is compared to the data that is retrievable by the LLM output SQL query. If the data to be retrieved by the LLM output SQL query is broader in scope than is allowed by the set of permissions, then database query engine 212 can perform modifying the query to restrict the scope of the obtained database data that can be fetched by the query and ultimately returned to the user. In some embodiments, the LLM output SQL query is validated and/or checked against data security rules and if the LLM output SQL query does not meet the validation and/or data security rules, database query engine 212 programmatically generates a new prompt to request the LLM to modify the previously generated SQL to meet the conditions prescribed by the rule(s). The LLM can then be iteratively prompted to modify a previously generated SQL query in this manner until the latest LLM-generated SQL query meets the conditions prescribed by the rule(s).

After making the appropriate post-processing/modifications to the model output SQL query and/or re-prompting the LLM (the database query generation model), database query engine 212 is configured to send the resulting SQL query to a target database platform (not shown in FIG. 2).

Matching data processing engine 214 is configured to receive the data from the database platform that is responsive to/matches the SQL query that is sent by database query engine 212. In some embodiments, the matching data to the SQL query comprises a structured table of data (e.g., one or more rows of data) or unstructured data (e.g., one or more values that are determined from the aggregation of matching structured data). In some embodiments, prior to presenting the matching data at the user interface back to the end user, matching data processing engine 214 may first evaluate the matching data against a set of response criteria and if needed, augment the matching data before presenting the (augmented) matching data at the user interface to the end user. For example, the set of response criteria may describe conditions for when the matching data should be modified, redacted at least in part, filtered prior to being presented at the user interface, or even discarded and not presented at the user interface. In a first example, matching data processing engine 214 may filter out at least a portion of the matching data if that portion is not within the scope that is permitted to be viewed by the end user (e.g., based on the user's organization, role, set of permissions, group/department within the organization, and the invoked business context). In a second example, matching data processing engine 214 may redact (e.g., by replacing the to be redacted values with other values) at least a portion of the matching data if that portion is not within the scope that is permitted to be viewed by the end user (e.g., based on the user's organization, role, set of permissions, group/department within the organization, and the invoked business context). In a third example, matching data processing engine 214 may determine that the matching data has an attribute (e.g., is a null set) that precludes the data from being presented at the user interface. For example, where the matching data is determined by matching data processing engine 214 to not be presented at the user interface, in some embodiments, matching data processing engine 214 may message prompt generation engine 208 to generate a new prompt to the LLM to receive a new SQL query that might fetch matching data that might better meet the criteria to be returned for the end user. In some embodiments, prior to presenting the (modified) matching data at the user interface back to the end user, matching data processing engine 214 is configured to generate additional and/or synthesize data based on the data fetched from the database to be presented together with the matching data at the user interface. For example, such additional data may include a visualization (e.g., a chart, a graph, a histogram) of the matching data. In another example, matching data processing engine 214 may prompt another LLM to generate a natural language summary of the matching data. In some embodiments, prior to presenting the (modified) matching data at the user interface back to the end user, matching data processing engine 214 is configured to infer an action to be programmatically performed on each target entity identified within the matching data. For example, the action can be inferred from the original user question and then matching data processing engine 214 can programmatically perform the inferred action for each target entity identified within the matching data.

Figure 3:
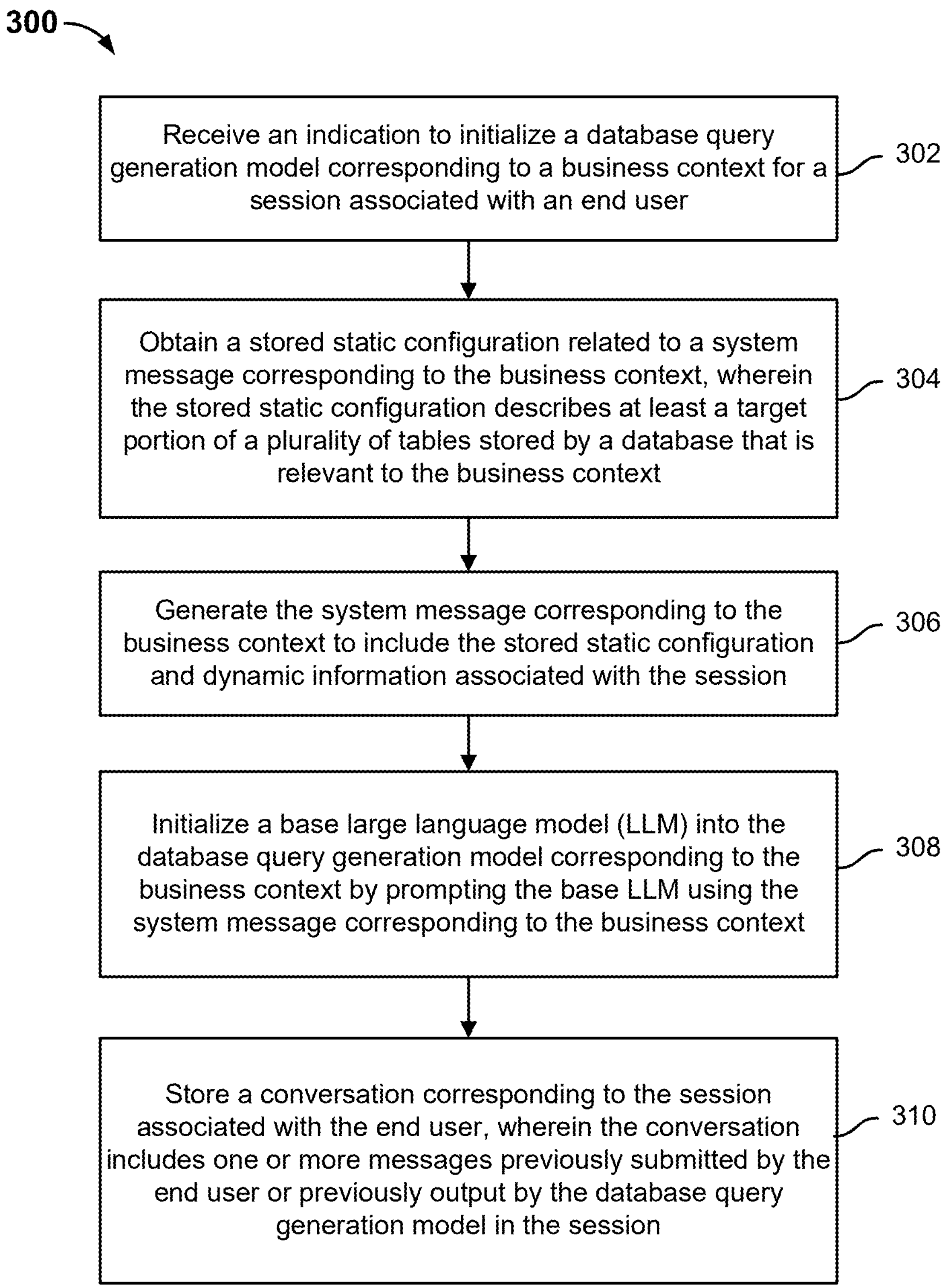
FIG. 3 is a flow diagram showing an example of a process for initializing a database query generation model in accordance with some embodiments.

FIG. 3 is a flow diagram showing an example of a process for initializing a database query generation model in accordance with some embodiments. In some embodiments, process 300 may be implemented, at least in part, at query generation server 104 of FIG. 1.

At 302, an indication to initialize a database query generation model corresponding to a business context for a session associated with an end user is received. In some embodiments, it is detected that an end user has entered/invoked a particular business context (e.g., through navigating to a given webpage or launching a given application).

At 304, a stored static configuration related to a system message corresponding to the business context is obtained, wherein the stored static configuration describes at least a target portion of a plurality of tables stored by a database that is relevant to the business context. In response to the end user's entering/invocation of that business context, a preconfigured set of static configurations associated with the business context is obtained from storage. As described above, the preconfigured set of static configurations includes, potentially among one or more other sections, descriptions regarding the physical structure of the table(s) and field(s) (and descriptions thereof) of the database where data relevant to this business context is stored, even if the actual tables at the database do not actually reflect that physical structure. In this way, this described target portion of the database virtualizes the tables at the database for the LLM.

At 306, the system message corresponding to the business context is generated to include the stored static configuration and dynamic information associated with the session. A set of dynamic information that comprises information for the business context and/or the end user associated with the session is also determined. A system message that includes both the preconfigured set of static configurations and the set of dynamic information is generated.

At 308, a base large language model (LLM) is initialized into the database query generation model corresponding to the business context by prompting the base LLM using the system message corresponding to the business context. The system message is sent as a prompt to a base LLM to initialize the LLM to subsequently act as an initialized database query generation model (an AI assistant or AI SQL expert) specific to the business context that can handle request(s) from the end user that are received over a user interface. In some embodiments, the user interface is presented as a chat interface between the end user and an AI assistant that represents the output from the initialized database query generation model. In the event that the set of static configurations within the system message is sent with a command to cause the initialized database query generation model to greet the end user and introduce itself as an AI Assistant for generating SQL queries to a given database platform, the LLM would generate such an introduction message that would be presented at the user interface to invite the end user to submit an initial request for data.

The following is an example of an introduction message that can be provided by the initialized database query generation model (which has been instructed by the introductory command associated with the system message):

"Greetings! I am Aura, your AI Snowflake SQL Expert. I am here to assist you with any queries you have regarding the Seismic platform, its users, content, and activity. Just ask away and I will provide you with the necessary SQL code to retrieve the information you need.

Here are a few example questions to get us started:

Can you provide a list of all active users in the platform?

How many lessons has each user completed?

What is the average engagement level for each content format?"

At 310, a conversation corresponding to the session associated with the end user is stored, wherein the conversation includes one or more messages previously submitted by the end user or previously output by the database query generation model in the session. The conversation that is to be stored for the session will include the back-and-forth between the end user and the responses output by the initialized database query generation model. For example, the messages submitted by the end user may include requests/questions for described data that is stored at a database and the responses from the LLM comprise LLM-generated SQL queries that can be used to fetch the requested data from the relevant database.

Figure 4:
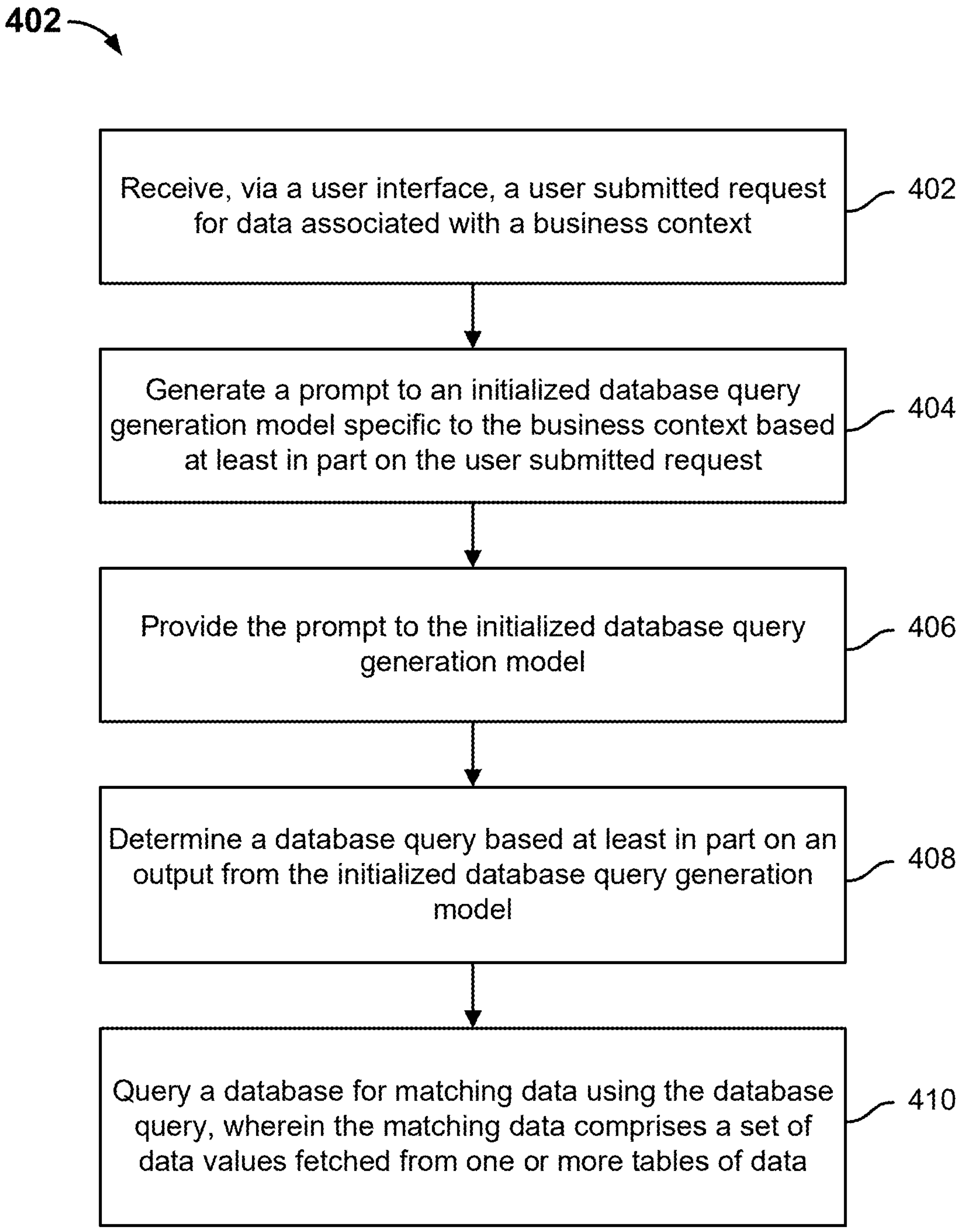
FIG. 4 is a flow diagram showing an embodiment of a process of data retrieval via secure database query generation.

FIG. 4 is a flow diagram showing an embodiment of a process of data retrieval via secure database query generation. In some embodiments, process 400 may be implemented, at least in part, at query generation server 104 of FIG. 1.

At 402, a user submitted request for data associated with a business context is received via a user interface. In some embodiments, process 400 is implemented with respect to an end user's session after process 300 of FIG. 3 has been implemented with respect to that same end user's session. In some embodiments, in response to the initial system message prompt, the initialized database query generation model returns an introduction message that is presented at the user interface that invites the end user to submit requests/questions for data for the current session.

At 404, a prompt to an initialized database query generation model specific to the business context is generated based at least in part on the user submitted request. A new prompt to the initialized database query generation model is generated to include the new user submitted request. In some embodiments, in addition to the new user submitted request, the new prompt is generated to include the original system message as well as an existing conversation of the current session. For example, the existing conversation includes any previously user submitted messages/requests/questions or LLM output messages in the current session. The reason to include the original system message and the conversation thus far, if any, in the new prompt is to ground/condition the LLM to the constraints of the original system message and to carry forth the full context of the existing conversation for the LLM to better process the new user submitted request. In some embodiments, the new prompt also includes a request for a natural language summary of the model output SQL query that reiterates the user request and also describes how the SQL query will go about finding the requested data.

At 406, the prompt is provided to the initialized database query generation model.

At 408, a database query is determined based at least in part on an output from the initialized database query generation model. In response to the new prompt, the initialized database query generation model is configured to output a database query (e.g., an SQL query). The LLM-generated SQL query is evaluated against a set of query criteria to determine whether the model output SQL query should be modified/post-processed. For example, one or more parameters can be added to the model output SQL query to further constrain or filter the amount of data that can be fetched from a database given the business context, an attribute of the end user, and/or a sensitivity of the requested data.

At 410, a database is queried for matching data using the database query, wherein the matching data comprises a set of data values fetched from one or more tables of data. The (modified) database query is then sent to a database platform and a set of matching data that matches the query is returned from the database. In some embodiments, the set of matching data comprises raw data obtained from the database. In some embodiments, the set of matching data comprises the result of performing one or more aggregations (e.g., summation) of raw data obtained from the database. In some embodiments, the matching data is modified before it is presented (along with the original user submitted request and/or the modified SQL query) at the user interface. In some embodiments, a visualization or text-based summary is also generated based on the matching data and the visualization and/or summary are also presented at the user interface.

Figure 5:
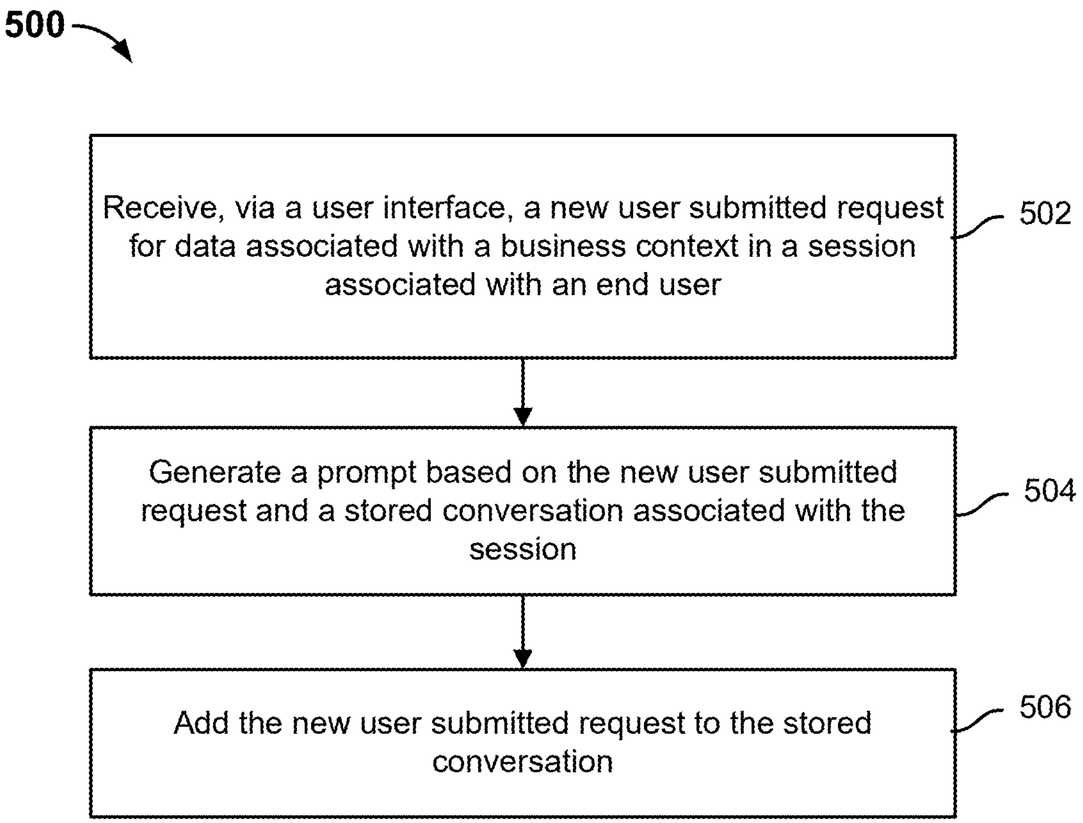
FIG. 5 is a flow diagram showing an example of a process of data retrieval via secure database query generation in accordance with some embodiments.

FIG. 5 is a flow diagram showing an example of a process of data retrieval via secure database query generation in accordance with some embodiments. In some embodiments, process 500 may be implemented, at least in part, at query generation server 104 of FIG. 1. In some embodiments, steps 402 and 404 of process 400 of FIG. 4 may be implemented, at least in part, using process 500.

At 502, a new user submitted request for data associated with a business context in a session associated with an end user is received via a user interface. After the system message corresponding to an invoked business context has been sent at least once to the base LLM (using a process such as process 300 of FIG. 3), the initialized LLM is ready to act as an AI assistant that is configured to have a conversation with the end user during the user's current session of data retrieval over the user interface. At the user interface, the end user can submit a question to the initialized LLM through the user interface.

At 504, a prompt is generated based on the new user submitted request and a stored conversation associated with the session. In some embodiments, a new prompt to the initialized database query generation model is generated by replacing one or more placeholder values of a preconfigured prompt template with the user submitted request. In some embodiments, in addition to updating the preconfigured prompt template with the user submitted request, the original system message and any previously user submitted or LLM generated messages in the stored conversation associated with the current session are also included in the new prompt. In some embodiments, the base LLM that is selected can accept a context window that is larger than the predicted maximum number of tokens that is expected to be used by a new prompt. For example, the context window of the base LLM is 10,000 tokens.

At 506, the new user submitted request is added to the stored conversation. The new user submitted request is added to the stored conversation associated with the current session so that if the user submits a subsequent request over the user interface, another new prompt can be generated to include the subsequent request as well as the full conversation between the end user and the LLM that occurred prior to that new request.

Figure 6:
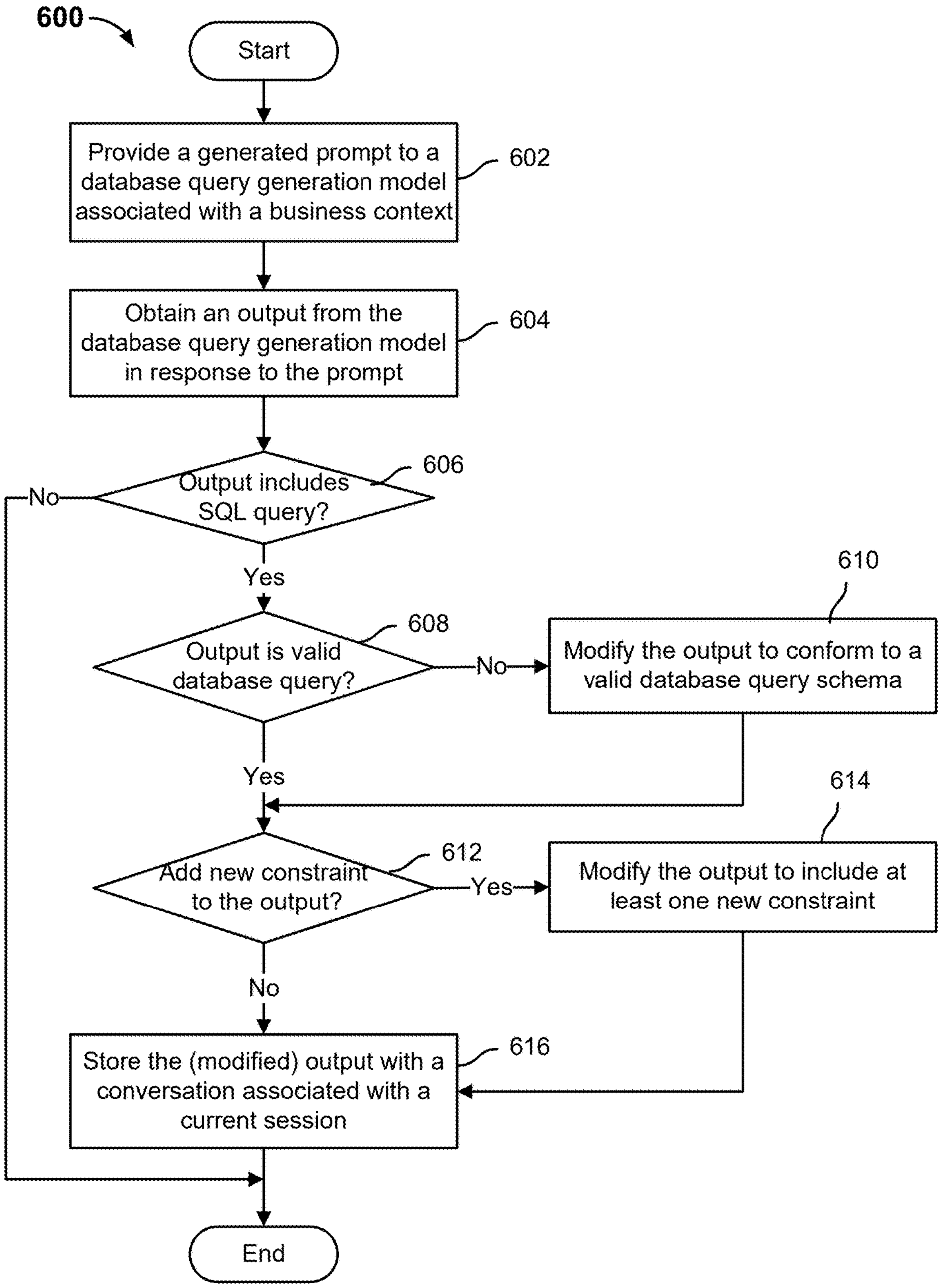
FIG. 6 is a flow diagram showing an example of a process for post-processing a database query generation model-generated output in accordance with some embodiments.

FIG. 6 is a flow diagram showing an example of a process for post-processing a database query generation model-generated output in accordance with some embodiments. In some embodiments, process 600 may be implemented, at least in part, at query generation server 104 of FIG. 1. In some embodiments, steps 406 and 408 of process 400 of FIG. 4 may be implemented, at least in part, using process 600.

At 602, a generated prompt is provided to a database query generation model associated with a business context. In some embodiments, a prompt is generated from a user submitted request to an initialized database query generation model specific to a business context using a process such as process 500 of FIG. 5. The prompt is then fed to the initialized database query generation model.

At 604, an output is obtained from the database query generation model in response to the prompt.

At 606, whether the output includes an SQL query is determined. In the event that the output includes an SQL query, control is transferred to 608. Otherwise, in the event that the output does not include an SQL query, process 600 ends. Thanks to the system message that was sent to the LLM to instruct it to act as the initialized database query generation model, the output from the initialized database query generation model is likely a database query in the form of an SQL query.

However, it is possible for the output of the initialized database query generation model to not include an SQL query in the event that the LLM determines that the user submitted request is not related to fetching the (e.g., domain-specific) data stored at the target database platform, for example. In that case, process 600 ends and the output of the LLM might be a message to invite the end user to submit a new request for the type(s) of data that is stored at the target database platform. The scenario of a model output that does not include an SQL query will not be described in process 600.

At 608, whether the output is a valid database query is determined. In the event that the output is not a valid database query, control is transferred to 610. Otherwise, in the event that the output is a valid database query, control is transferred to 612. The model output SQL query is parsed and then compared to a stored valid database query schema corresponding to the target database platform. For example, different database platforms may use slightly different database query schema and so it is determined whether the model output complies with the specific database query schema of the target database platform (e.g., associated with the business context or domain for which data is being requested).

At 610, the output is modified to conform to a valid database query schema. In the event that the model output SQL query as-is cannot be validated against the specific database query schema of the target database platform, the model output SQL query is modified to conform to the schema. For example, a modification may include replacing an invalid syntax of one inferred type with a valid syntax of the same type.

At 612, whether a new constraint should be added to the output is determined. In the event that a new constraint should be added to the output, control is transferred to 614. Otherwise, in the event that a new constraint should not be added to the output, control is transferred to 616. To meet data security requirements, the model output SQL query is compared against various criteria that detect whether the data scope that is accessible with the LLM generated SQL query is consistent with one or more data security aspects. For example, aspects include the invoked business context, the end user's set of permissions, the end user's organization, and the end user's role within the organization. In the event that the LLM generated SQL query is determined to access a greater data scope (e.g., more data values at the database platform) than what is allowed given the invoked business context, the end user's set of permissions, the end user's organization, and/or the end user's role within the organization, at least one parameter that represents a new constraint (or filter) on the data accessible at the database is added to the LLM generated SQL query to limit the data scope offered by the original query to match the scope that is permitted.

At 614, the output is modified to include at least one new constraint. As described above, various different types of constraints can be added to the LLM generated SQL query. A first example constraint is a row-filtering parameter (e.g., in the form of a subquery) and/or a row redacting parameter that limits which rows of data from the database that can match the query or be visible to the requesting user. A second example constraint is a column filtering parameter (e.g., in the form of a subquery) and/or a column redacting parameter that limits which columns of data from the database that can match the query or be visible to the requesting user.

At 616, the (modified) output is stored with a conversation associated with a current session. The (potentially) modified version of the model output SQL query is added to the stored conversation associated with the current session so that if the user submits a subsequent request over the user interface, another new prompt can be generated to include this model output SQL query as well as the full conversation between the end user and the LLM that occurred prior to that new request.

Figure 7:
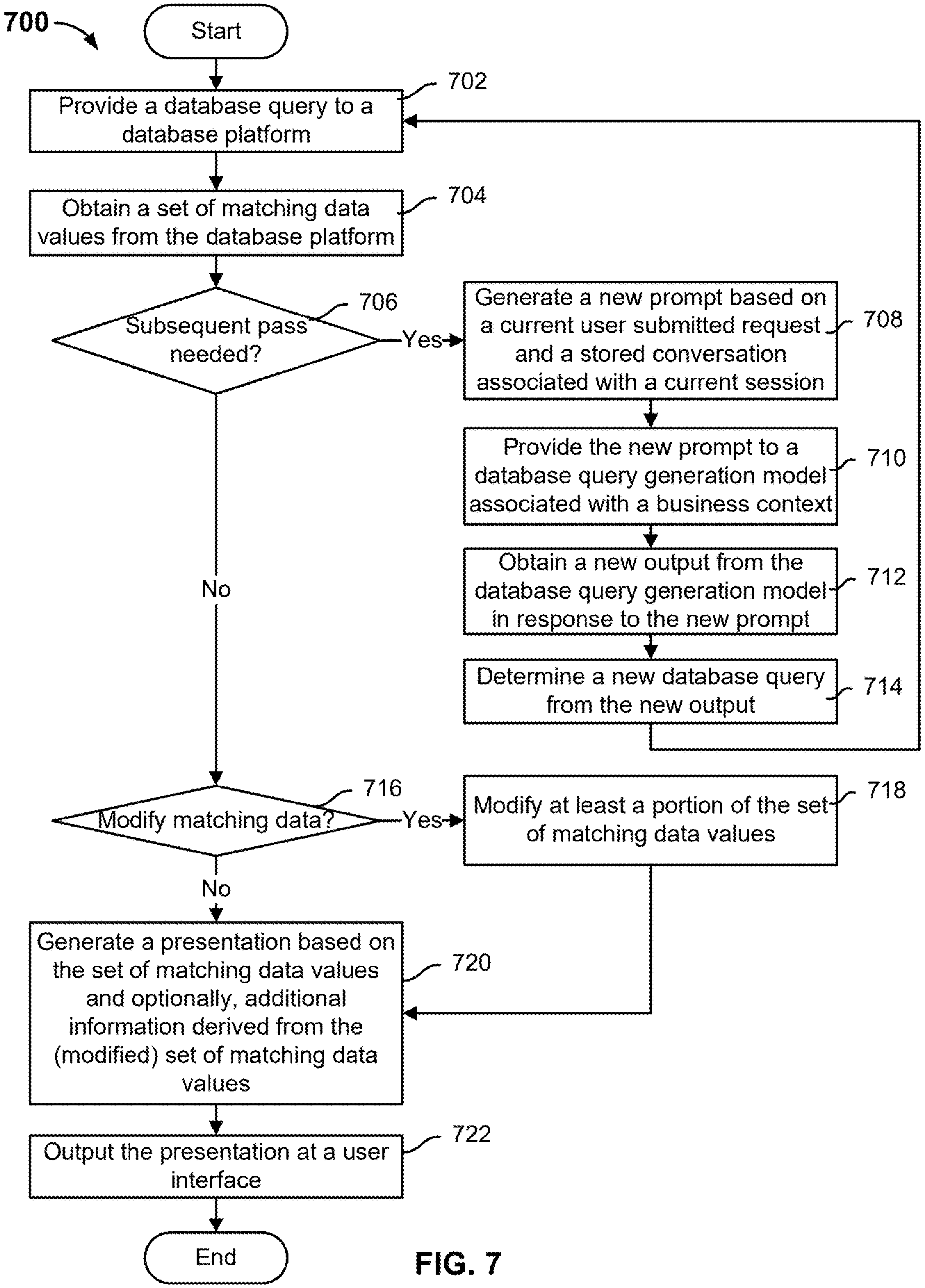
FIG. 7 is a flow diagram showing an example of a process for presenting a set of matching data values that are retrieved from a database in accordance with some embodiments.

FIG. 7 is a flow diagram showing an example of a process for presenting a set of matching data values that are retrieved from a database in accordance with some embodiments. In some embodiments, process 700 may be implemented, at least in part, at query generation server 104 of FIG. 1. In some embodiments, step 410 of process 400 of FIG. 4 may be implemented, at least in part, using process 700.

At 702, a database query is provided to a database platform. In some embodiments, a database query is determined based on an output by a database query generation model corresponding to a business context (e.g., using a process such as process 600 of FIG. 6) and in response to a prompt that was generated from an end user submitted request (e.g., using a process such as process 500 of FIG. 5).

At 704, a set of matching data values is obtained from the database platform. Data values from the target portion of the database that was described within the system message that was used to initialize the database query generation model and that match the provided database query are returned. In some embodiments, the set of matching values may comprise a single value or a structured set of one or more values. For example, a set of one or more values may include one or more rows (or portions thereof) of data from the database. In some embodiments, the set of matching values comprises an aggregation result that has been determined by performing an aggregation (e.g., a total count) described by the SQL query on values stored at the database that matched that query.

At 706, whether a subsequent pass is needed is determined. In the event that a subsequent pass is needed, control is transferred to 708. Otherwise, in the event that a subsequent pass is not needed, control is transferred to 716. Prior to presenting the set of matching data values at the user interface through which the end user submits requests, the set of matching data values is compared against a set of response criteria to determine whether the database query generation model (LLM) should be prompted with a new prompt in a subsequent pass. For example, the set of response criteria may describe a condition in which the database query generation model (LLM) should be prompted with a new prompt that is derived from the same user request. In a specific example, if the set of matching data values included fewer or greater than predetermined thresholds or included values that were outliers (e.g., beyond a given margin) of expected values, then it may be assumed that the unlikely set of matching data values were obtained due to an inaccurate database query and so a subsequent pass should be performed.

At 708, a new prompt is generated based on a current user submitted request and a stored conversation associated with a current session. A new and different (from a previous instance) prompt is generated from the same user request that resulted in the set of matching data values that triggered the subsequent pass.

At 710, the new prompt is provided to a database query generation model associated with a business context.

At 712, a new output is obtained from the database query generation model in response to the new prompt. The database query generation model is fed to the new prompt to cause a different output data query (SQL query) to be generated by the output.

At 714, a new database query is determined from the new output. Similar to what is described in process 600 of FIG. 6, the new output data query can be modified before being provided to the database platform to fetch a new set of matching values.

At 716, whether the set of matching data should be modified is determined. In the event that the set of matching data should be modified, control is transferred to 718. Otherwise, in the event that the set of matching data should not be modified, control is transferred to 720. For example, the set of response criteria may also describe a condition in which the set of matching data values should be modified (and how) prior to being presented to an end user. In a specific example, a response criterion describes that if the set of matching values includes fields that are not permissible to be accessed by the end user, then those matching data values of those fields should not be presented to the end user.

At 718, at least a portion of the set of matching data values is modified. In an example, if a portion of the set of matching data values has been determined to not be presented to the end user, then that portion can be removed from the matching data, redacted (e.g., replaced with predetermined values), or obfuscated.

At 720, a presentation is generated based on the set of matching data values and optionally, additional information derived from the (modified) set of matching data values. In various embodiments, the presentation of the matching data from the database includes at least the database query that was used and the set of matching data values. In some embodiments, one or more visualizations of the set of matching data values can be generated and additionally presented at the user interface. Examples of such visualization can include a graph, a table, or a chart. In some embodiments, a synthesis of the set of matching data values can be generated and additionally presented at the user interface. An example of such a synthesis may include a natural language summary of the set of matching data values that is generated by prompting another LLM to summarize the set of matching data values. For example, one advantage of generating such a summary is to distill a set of structured data with potential temporal elements into a succinct set of observed trends over time.

At 722, the presentation is output at a user interface. The presentation is presented at the user interface with the end user and appears as messages from the AI assistant.

Figure 8:
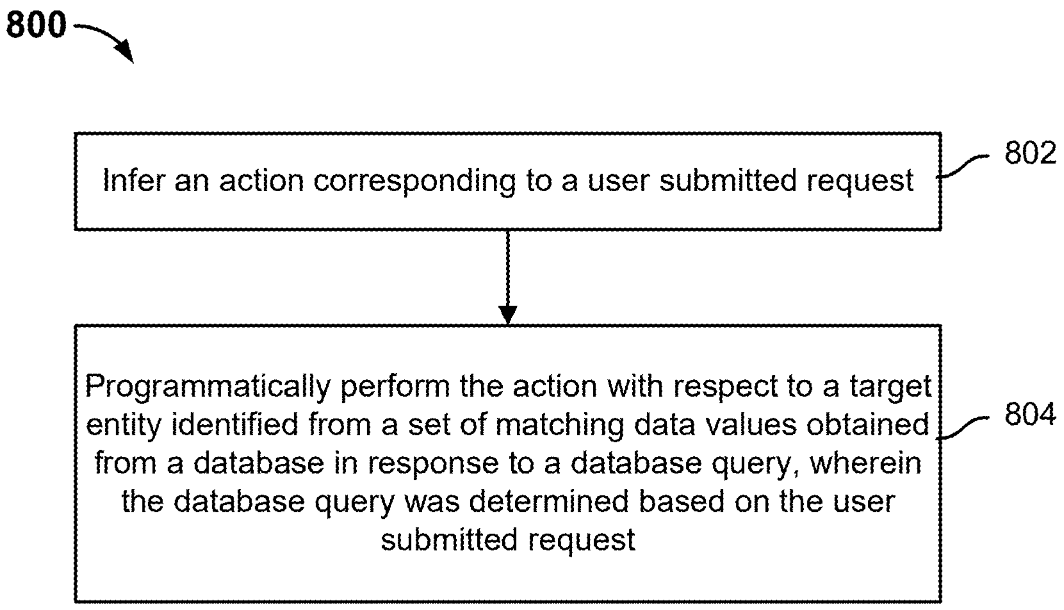
FIG. 8 is a flow diagram showing an example of a process for performing an action corresponding to a set of matching data values obtained from a database in accordance with some embodiments.

FIG. 8 is a flow diagram showing an example of a process for performing an action corresponding to a set of matching data values obtained from a database in accordance with some embodiments. In some embodiments, process 800 may be implemented, at least in part, at query generation server 104 of FIG. 1.

At 802, an action corresponding to a user submitted request is inferred. An action that can be performed with target entities that are identified within database data that matches the user submitted request is determined. Prior to or at least partially concurrently to generating a new prompt to the database query generation model based on the user submitted request, an action to be potentially performed using data that is ultimately fetched from a database based on that request can be determined.

At 804, the action is programmatically performed with respect to a target entity identified from a set of matching data values obtained from a database in response to a database query, wherein the database query was determined based on the user submitted request. The new prompt is generated based on that user submitted request and is then fed to the database query generation model. The SQL query (e.g., after modification) output by the database query generation model is sent to the target database platform. In response to the SQL query, the target database platform returns a set of matching data values. Then, the set of matching data values is parsed to determine one or more target entities against which the inferred action should be performed. After the one or more target entities are identified from the set of matching values, the inferred action is programmatically performed on each such target entity. For example, the action that is inferred from the original user submitted request that led to the retrieval of the set of matching data values can be performed by calling an application programming interface (API) associated with effecting that action at a target platform. In some embodiments, prior to performing the inferred action against each target entity identified among the set of matching data values, a message asking the end user if they approve performing the inferred action against the target entities is presented within the user interface. If the end user approves (e.g., sends a message of approval), then the action is programmatically performed against each target entity.

For example, the user submitted request that is sent to the initialized database query generation model over a user interface may be "Users who have not logged into a given program in the last 30 days should be deactivated." While a new prompt is generated based on that user submitted request (e.g., using a process such as process 500 of FIG. 5), the action of programmatically deactivating each user that has not logged in in the last 30 days is also inferred from the request. In this example, the action that is inferred from the request is to deactivate the account of a user that matches the request. The new prompt is provided to the database query generation model and an SQL query is determined from the model's output (e.g., using a process such as process 600 of FIG. 6). Furthermore, the determined SQL query is sent to the target database platform and a set of matching data values, which describes users who have not logged into the given program in the last 30 days, is returned from the database platform. The set of matching data values is parsed to determine the name or other identifying information of each user who has not logged into the given program in the last 30 days. Then, the inferred action of deactivating the account may be programmatically performed for each identified user (e.g., after receiving the approval of the end user who had submitted the original request).

Figure 9:
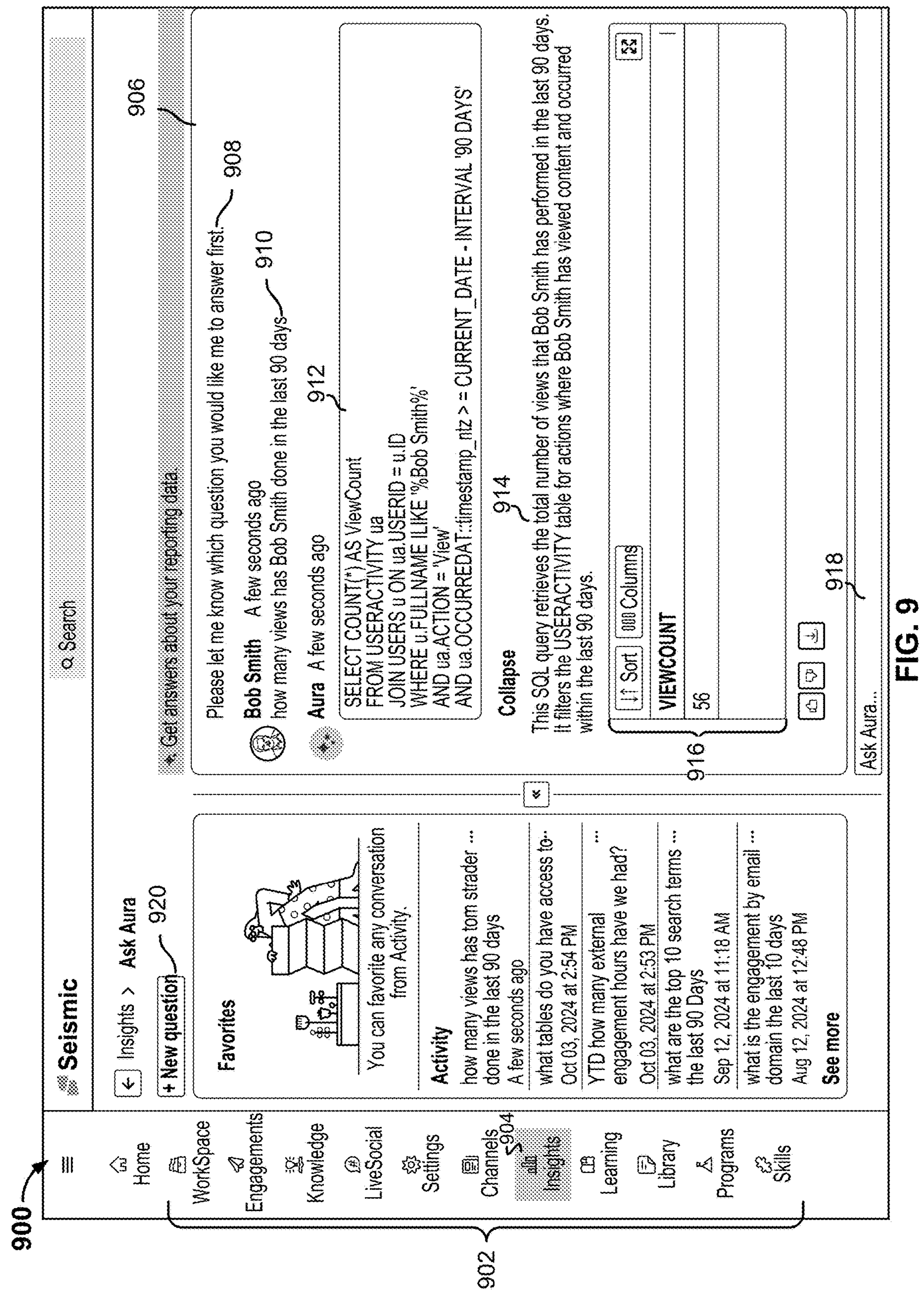
FIG. 9 is a diagram showing a first example of a user interface through which an end user can submit request(s) for data stored at a database in accordance with some embodiments.

FIG. 9 is a diagram showing a first example of a user interface through which an end user can submit request(s) for data stored at a database in accordance with some embodiments. User interface 900 may be presented in response to an end user named "Bob Smith" invoking/selecting business context 904 named "Insights" from menu 902, which includes icons associated with several business contexts (e.g., "Workspace," "Engagements," "Knowledge," "LiveSocial," "Settings," "Channels," "Insights," "Learning," "Library," "Programs," and "Skills"). As described above, after the end user "Bob Smith" selected business context 904, the query generation server may have initialized a base LLM to act as an initialized database query generation model (the AI assistant named "Aura" in the example of FIG. 9) for the business context of "Insights" by prompting the LLM with a system message (e.g., using a process such as process 300 of FIG. 3) that included an introductory command to the LLM. After being initialized and receiving the introductory command, the database query generation model outputs introduction message 908, which is presented in chat interface 906. After introduction message 908 is presented, end user "Bob Smith" had submitted (through input field 918) request 910 that is "How many views has Bob Smith done in the last 90 days." In response to request 910, the query generation server may have generated a new prompt based on request 910 (e.g., using a process such as process 500 of FIG. 5) and fed the new prompt to the database query generation model. The database query generation model's output was post-processed (e.g., using a process such as process 600 of FIG. 6) to determine SQL query 912, which is presented within chat interface 906. Natural language summary 914 describes what SQL query 912 is constructed to do including what data it seeks to retrieve and how a portion of the data will be filtered given request 910. For example, natural language summary 914 was generated by the same initialized database query generation model that had generated SQL query 912. In some embodiments, a request for natural language summary of the model output SQL query such as natural language summary 914 is included in the prompt for the SQL query. In the backend, the query generation server also provides SQL query 912 to the target database platform and receives a set of matching data values and processes the matching data (e.g., using a process such as process 700 of FIG. 7). In the example of FIG. 9, the set of matching data comprises the aggregation (the total number of views) of all views that Bob Smith had performed with respect to any content items (within the target portion of the database associated with the "Insights" business context) in the last 90 days. The aggregated total view count ("56") is then presented with a corresponding column name of "VIEWCOUNT" in matching data section 916. After reviewing the presented "VIEWCOUNT," Bob Smith could potentially ask follow-up requests by inputting a subsequent message into user input field 918 or a new question of Aura by selecting "New Question" button 920.

Figure 10:
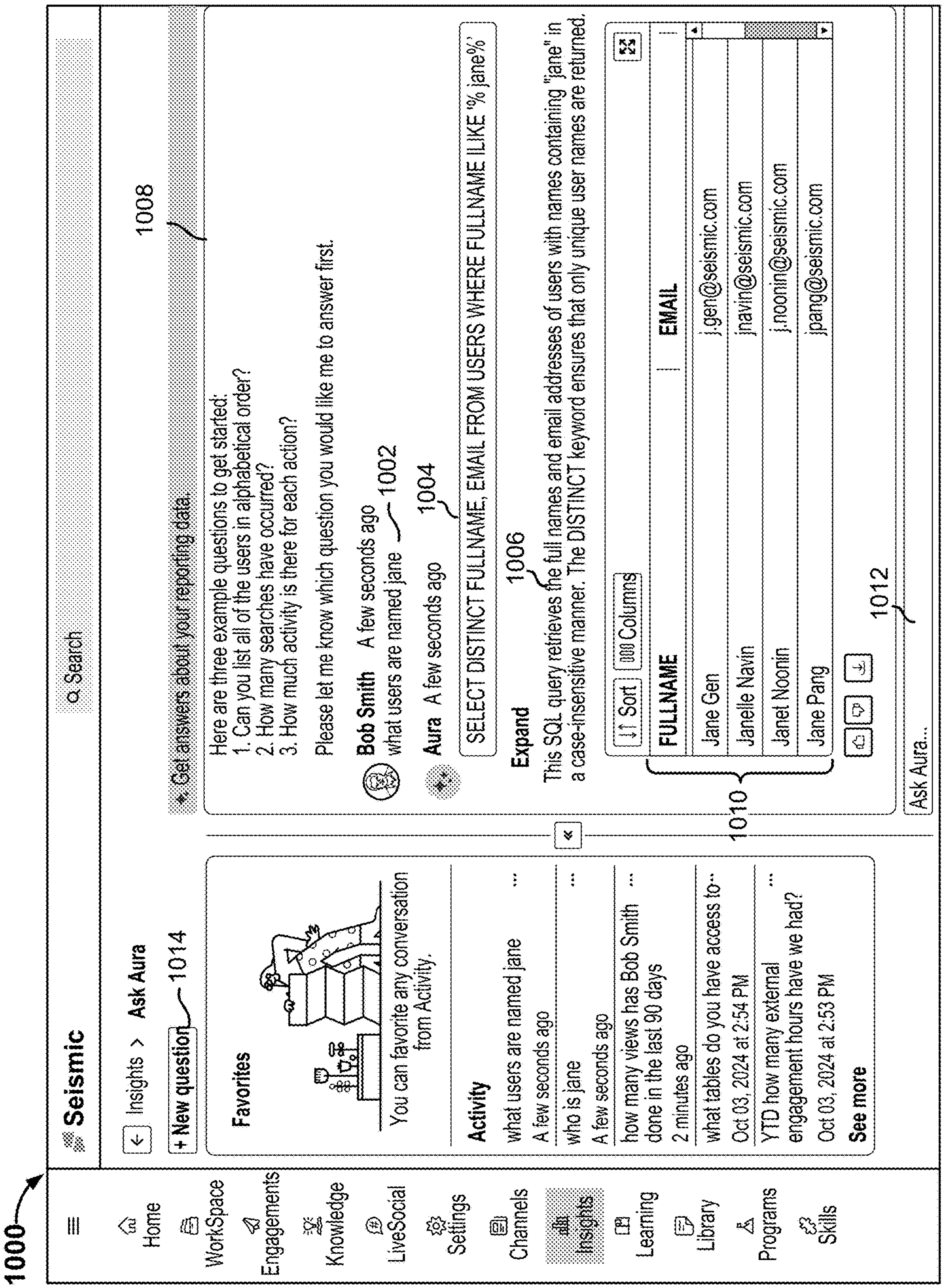
FIG. 10 is a diagram showing a second example of a user interface through which an end user can submit request(s) for data stored at a database in accordance with some embodiments.

FIG. 10 is a diagram showing a second example of a user interface through which an end user can submit request(s) for data stored at a database in accordance with some embodiments. User interface 1000 may be presented in response to an end user named "Bob Smith" invoking/selecting the "Insights" business context. Similar to the example described with FIG. 9, a database query generation model (the AI assistant named "Aura" in the example of FIG. 10) was initialized for the business context of "Insights." To begin a new conversation, user "Bob Smith" had submitted (through input field 1012) request 1002 "what users are named jane." In response to request 1002, the query generation server may have generated a new prompt based on request 1002 (e.g., using a process such as process 500 of FIG. 5) and fed the new prompt to the database query generation model. The database query generation model's output was post-processed (e.g., using a process such as process 600 of FIG. 6) to determine SQL query 1004, which is presented within chat interface 1008. Natural language summary 1006 describes what SQL query 1004 is constructed to do including what data it seeks to retrieve. In the backend, the query generation server also provides SQL query 1004 to the target database platform and receives a set of matching data values and processes the matching data (e.g., using a process such as process 700 of FIG. 7). In the example of FIG. 10, the set of matching data includes a list of all distinct user names (within the target portion of the database associated with the "Insights" business context) that include "jane" and corresponding email addresses. This list of matching user names and corresponding email addresses is presented within matching data section 1010. After reviewing the presented matching data section 1010, Bob Smith could potentially ask follow-up requests by inputting a subsequent message into user input field 1012 or a new question of Aura by selecting "New Question" button 1014.

Figure 11:
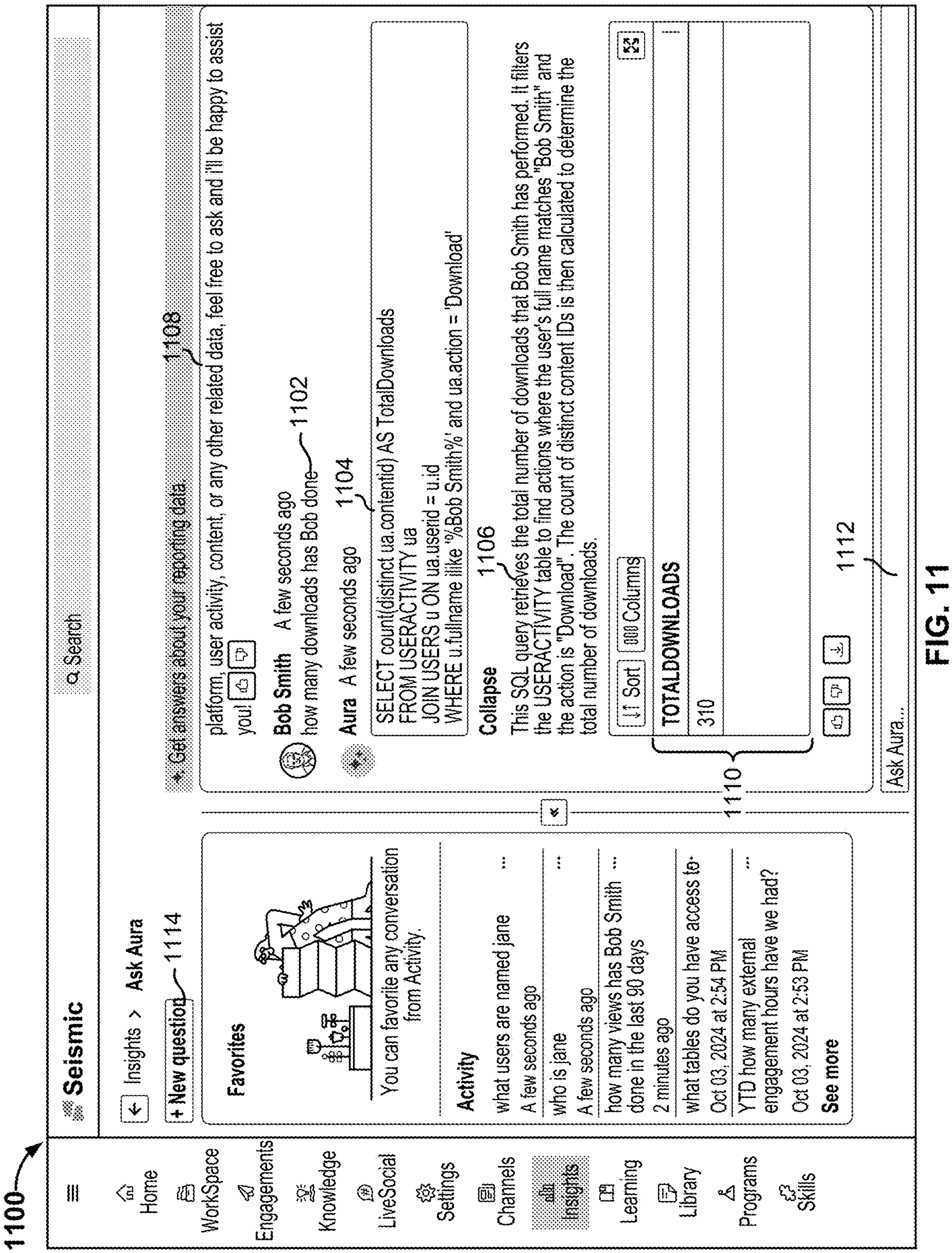
FIG. 11 is a diagram showing a third example of a user interface through which an end user can submit request(s) for data stored at a database in accordance with some embodiments

FIG. 11 is a diagram showing a third example of a user interface through which an end user can submit request(s) for data stored at a database in accordance with some embodiments. User interface 1100 may be presented in response to an end user named "Bob Smith" invoking/selecting the "Insights" business context. Similar to the example described with FIG. 9, a database query generation model (the AI assistant named "Aura" in the example of FIG. 11) was initialized for the business context of "Insights." To begin a new conversation, user "Bob Smith" had submitted (through input field 1110) request 1102 "how many downloads has Bob done." In response to request 1102, the query generation server may have generated a new prompt based on request 1102 (e.g., using a process such as process 500 of FIG. 5) and fed the new prompt to the database query generation model. The database query generation model's output was post-processed (e.g., using a process such as process 600 of FIG. 6) to determine SQL query 1104, which is presented within chat interface 1108. Natural language summary 1106 describes what SQL query 1104 is constructed to do including what data it seeks to retrieve, what data will be filtered, and how the matching raw data will be aggregated. In the backend, the query generation server also provides SQL query 1104 to the target database platform and receives a set of matching data values and processes the matching data (e.g., using a process such as process 700 of FIG. 7). In the example of FIG. 11, the set of matching data values (within the target portion of the database associated with the "Insights" business context) includes an aggregation (the total count) of the distinct IDs among a list of actions where the user's full name matches "Bob Smith" and the action is "Download." This total number of downloads ("TOTALDOWNLOADS") is presented within matching data section 1110. After reviewing the presented matching data section 1110, Bob Smith could potentially ask follow-up requests by inputting a subsequent message into user input field 1112 or a new question of Aura by selecting "New Question" button 1114.

While there are many ways to build prompts and many of which will produce results, the embodiments described herein are believed to have significant benefits over more generic approaches. By providing appropriate business context to the LLM and not requiring it to attempt to self-discover or blind-navigate the data model, the following benefits are achieved:

1. More predictable model output
2. More control over model output
3. More reliable and trustworthy results
4. Higher performance (lower response latency) versus multi-prompt discovery approaches
5. Reduced cost and LLM consumption versus multi-prompt discovery approaches By performing post processing on LLM-generated SQL queries with techniques, such as, for example, use case specific data filtering and obfuscation in code as described above, this data retrieval approach can be easily scaled to a large variety of use cases quickly and securely while keeping LLM prompts as minimal and targeted as possible.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a database interface configured to query a database that stores a plurality of tables of data; and one or more processors configured to:

receive an indication to obtain an initialized database query generation model for a session associated with an end user;

obtain a stored static configuration related to a system message corresponding to a business context, wherein the stored static configuration describes at least a target portion of the plurality of tables of data that is relevant to the business context;

generate the system message corresponding to the business context to include the stored static configuration and dynamic information associated with the session;

initialize a base large language model (LLM) into the initialized database query generation model by prompting the base LLM using the system message corresponding to the business context;

store a conversation corresponding to the session associated with the end user, wherein the conversation includes one or more messages previously submitted by the end user or previously output by the initialized database query generation model during the session;

receive, via a user interface, a user submitted request for data associated with the business context;

generate a prompt to the initialized database query generation model specific to the business context based at least in part on the user submitted request;

provide the prompt to the initialized database query generation model;

determine a database query based at least in part on an output from the initialized database query generation model; and query the database for matching data using the database query, wherein the matching data comprises a set of data values fetched from one or more tables of data.

2. The system of claim 1, wherein the stored static configuration further includes one or more of the following: an assistant job description, response rules and fundamentals, common aggregations, use case additional context, and an introductory command.

3. The system of claim 1, wherein the at least target portion of the plurality of tables of data that is relevant to the business context comprises a specified set of tables, a specified set of fields, purposes of the specified set of tables, and purposes of the specified set of fields.

4. The system of claim 1, wherein the one or more processors are further configured to determine the dynamic information associated with the session including one or more of the following: dynamic information associated with the business context and dynamic information associated with the end user.

5. The system of claim 1, wherein to generate the prompt to the initialized database query generation model specific to the business context comprises to include the user submitted request, a previous system message that was previously sent to the initialized database query generation model, and a previous user submitted request into the prompt.

6. The system of claim 1, wherein to determine the database query based at least in part on the output from the initialized database query generation model comprises to:

determine whether the output conforms to a valid query schema associated with the database; and in response to a determination that the output does not conform to the valid query schema associated with the database, modify the output to conform to the valid query schema.

7. The system of claim 1, wherein to determine the database query based at least in part on the output from the initialized database query generation model comprises to:

determine whether a constraint is to be added to the output; and in response to a determination that the constraint is to be added to the output, modify the output to include the constraint.

8. The system of claim 7, wherein to determine whether the constraint is to be added to the output comprises to determine whether a first data scope that is accessible by the output is greater than a second data scope that is permissible to the end user associated with the user submitted request.

9. The system of claim 7, where the constraint comprises a row-level filter or a row-level redaction.

10. The system of claim 7, where the constraint comprises a column-level filter or a column-level redaction.

11. The system of claim 1, wherein the one or more processors are further configured to:

determine whether to modify the matching data; and in response to a determination to modify the matching data, remove, redact, or obfuscate at least a portion of the matching data prior to generating a presentation based at least in part on the matching data.

12. The system of claim 1, wherein the one or more processors are further configured to:

generate a presentation based at least in part on the matching data; and present the presentation at the user interface.

13. The system of claim 12, wherein to generate the presentation based at least in part on the matching data comprises to:

determine additional information from the matching data; and present the additional information with the matching data at the user interface.

14. The system of claim 13, wherein the additional information comprises a natural language summary of the matching data or a visualization.

15. The system of claim 1, wherein the one or more processors are further configured to:

infer an action corresponding to the user submitted request; and programmatically perform the action with respect to a target entity identified from the matching data.

16. A method, comprising:

receiving an indication to obtain an initialized database query generation model for a session associated with an end user;

obtaining a stored static configuration related to a system message corresponding to a business context, wherein the stored static configuration describes at least a target portion of a plurality of tables of data that is relevant to the business context;

generating the system message corresponding to the business context to include the stored static configuration and dynamic information associated with the session;

initializing a base large language model (LLM) into the initialized database query generation model by prompting the base LLM using the system message corresponding to the business context;

storing a conversation corresponding to the session associated with the end user, wherein the conversation includes one or more messages previously submitted by the end user or previously output by the initialized database query generation model during the session;

receiving, via a user interface, a user submitted request for data associated with the business context;

generating a prompt to the initialized database query generation model specific to the business context based at least in part on the user submitted request;

providing the prompt to the initialized database query generation model;

determining a database query based at least in part on an output from the initialized database query generation model; and querying a database for matching data using the database query, wherein the matching data comprises a set of data values fetched from one or more tables of data.

17. The method of claim 16, wherein the stored static configuration further includes one or more of the following: an assistant job description, response rules and fundamentals, common aggregations, use case additional context, and an introductory command.

18. The method of claim 16, wherein the at least target portion of the plurality of tables of data that is relevant to the business context comprises a specified set of tables, a specified set of fields, purposes of the specified set of tables, and purposes of the specified set of fields.

* * * * *